Patented Jan. 11, 1944

2,338,782

UNITED STATES PATENT OFFICE 2,338,782

CYANINE DYESTUFF

Oskar Riester, Dessau, Germany; vested in the Alien Property Custodian

No Drawing. Application November 18, 1941, Serial No. 419,570. In Germany July 30, 1940

6 Claims. (Cl. 260—240)

My present invention relates to new cyanine dyestuffs.

It is known that cyanine dyestuffs are produced by condensing a nitrogenous heterocyclic base having a reactive methyl or methylene group with a dimethylaminobenzaldehyde. These dyestuffs which are different from most of the other dyestuffs owing to the specially intensive tint of their colorings can, however, sufficiently dye merely wool, silk, and cotton treated with a mordant whereas the coloring of other fabrics as, for instance, acetate silk yields pale tints only.

The present invention is based on the observation that extremely intensive colorings can also be obtained with acetate silk by means of dyestuffs prepared by condensing nitrogenous heterocyclic bases having a reactive methyl or methylene group with halogen-hydroxybenzaldehydes containing in the hydroxy groups in the 2- and/or 4-positions and the halogen atoms in the 3- and/or 5-positions. Moreover, the halogen-hydroxy-benzaldehydes may carry further substituents as, for instance, alkyl, alkoxy, thioalkyl or carboxyl groups. The dyestuffs thus prepared have the following general formula:

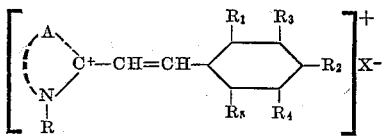

wherein A is a grouping of molecules necessary to complete a 5- or 6-membered ring usual in cyanine dye art, such as indoline, thiazole, oxazole, quinoline, lepidine, benzimidazole, thiodiazole, isofurodiazole, selenazole and the like; these rings may be substituted by alkyl, aryl, benzyl, phenylene, naphthalene, substituted phenyls or heterocyclic nuclei or condensed with aromatic or heterocyclic rings; R is alkyl, aryl, aralkyl, alkylene, alkylenecarboxylic acid; $R_1$ and $R_2$ are hydroxyl groups or one of $R_1$ and $R_2$ is hydroxyl whereas the other substituent is hydrogen, alkyl, alkoxy, thioalkyl, carboxyl or another radicle; $R_3$ and $R_4$ are halogen groups or one of $R_3$ and $R_4$ is halogen and the other substituent is hydrogen, alkyl, alkoxy, thioalkyl, carboxyl or another radicle; $R_5$ is hydrogen, alkyl, alkoxy, thioalkyl, carboxyl or another substituent; X is an acid radicle as, for instance, Cl, Br, I, $SO_4$, $ClO_4$, $SO_3CH_3$, $SO_3C_2H_5$, $SO_3C_6H_4.CH_3$.

The preparation of the dyestuffs is conveniently carried out by melting together the reactants in molecular proportions at an elevated temperature for about 10 minutes to 2 hours with or without the employment of a solvent. It is advantageous to dissolve the fused mass in methanol, acetone or a similar solvent and split off 1 mol of acid from the dyestuff molecule by adding thereto basic agents, such as sodium-acetate, ammonia, sodiumbicarbonate, piperidine or the like so as to produce dyestuffs forming especially pure crystals. The structure of these dyestuffs may be represented by the following formula of the quinoid type:

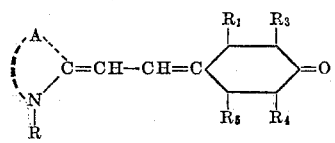

or

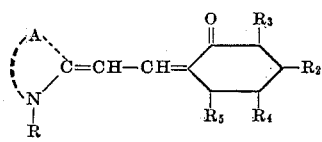

It is, however, more accurate to give the dyestuffs a betaine-like structure of the intramolecular ionoid type:

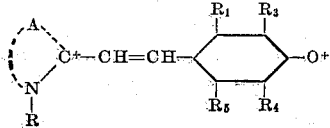

or

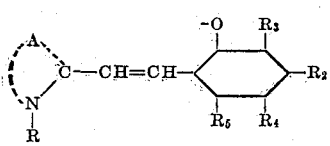

The following examples are illustrative of my invention but they are not intended to be limiting.

Example 1

A mixture of 3 g. of 2-methylbenzoxazole ethyliodide, 3 g. of 3.5-dibromo-4-hydroxy-benzaldehyde and 1 cc. of isoquinoline is melted at 110° C. for 10 minutes while stirring. The still hot melted mass is then dissolved in methanol and mixed with about 30 cc. of a 12% solution of sodium acetate in methanol. A dyestuff of the following constitution crystallizes:

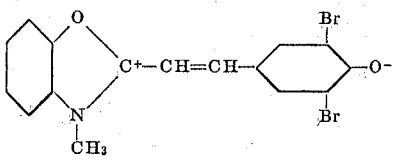

Color of the methanolic solution: orange-yellow.
Coloring of the acetate silk: orange-red.

Example 2

4 g. of 2-methyl-4.5-diphenylthiazole ethyliodide and 3 g. of 3.5-dibromo-4-hydroxybenzaldehyde are dissolved while boiling in a mixture of 20 cc. pyridine and 20 cc. of alcohol. The mass is then mixed with 2 cc. of piperidine and heated to 90° C. for 1 hour. On cooling the following dyestuff crystallizes out:

[Structural formula of dyestuff with benzothiazole, CH=CH linkage, and dibromo-phenolate group, N-C₂H₅]

Color of the methanolic solution: red-violet. Coloring of the acetate silk: red.

Example 3

A mixture of 4.5 g. of 2-methyl-β-naphthothiazole ethyl-iodide, 3 g. of 3.5-dibromo-4-hydroxybenzaldehyde, 20 cc. pyridine, 20 cc. of propanol, and 2 cc. of piperidine is boiled for half an hour. A dyestuff of the following formula crystallizes out:

[Structural formula with naphthothiazole, CH=CH linkage, and dibromo-phenolate group, N-C₂H₅, Br⁻ and Br⁺ labels]

Color of the methanolic solution: red-violet. Absorption maximum: 550 mμ;
Color of the piperidine solution: blue-violet. Absorption maximum: 590 mμ;
Coloring of acetate silk: intensive red-violet.

Example 4

A mixture of 1.5 g. of 2-methyl-4-phenylisofurodiazole and 1 cc. of dimethylsulfate is heated to 120° C. for half an hour. The mass is then mixed with 2 g. of dibromohydroxybenzaldehyde and kept at this temperature for half an hour. The dyestuff forms yellow crystals which dissolve in a solution of methanol and some drops of pyridine with a dark yellow color. The formula is as follows:

[Structural formula in brackets with phenyl-isofurodiazole, CH=CH linkage, dibromo-hydroxyphenyl group, N-CH₃, CH₃SO₄⁻ counterion]

Absorption maximum: about 500 mμ. Coloring of the acetate silk: yellow-orange.

Example 5

An orange-red dyestuff of the following constitution is obtained by means of 2.5-dimethylthiazole in an analogous manner to that as described in Example 4:

[Structural formula in brackets with dimethylthiazole, CH=CH linkage, dibromo-hydroxyphenyl group, N-CH₃, CH₃SO₄⁻ counterion]

Coloring: orange-red.

Example 6

A mixture of 3 g. of quinoldine ethliodide, 3 g. of dibromohydroxybenzaldehyde, and 10 cc. of pyridine is boiled for half an hour. A violet-red dyestuff of the following constitution crystallizes out:

[Structural formula with quinoline, CH=CH linkage, and dibromo-phenolate group, N-C₂H₅]

Color of the solution: red-violet. Absorption maximum: about 550 mμ.

Example 7

A mixture of equimolecular amounts of 2-methylthiazoline methyliodide and 3.5-diiodo-4-hydroxybenzaldehyde and some drops of pyridine are melted together at 120° C. for 1 hour. The masss thus prepared is then dissolved in methanol. On addition of an ammonia solution of 1% strength a dyestuff of the following formula is obtained.

[Structural formula with thiazoline, CH=CH linkage, diiodo-phenolate group, N-CH₃]

Color of the methanolic solution and coloring: pure-yellow.

Example 8

5 g. of 2.5.6-trimethylbenzselenazole ethyliodide are condensed with 5 g. of 3-bromo-4-hydroxybenzaldehyde in the presence of 10 cc. of pyridine. One obtains a red dyestuff of the following constitution:

[Structural formula with trimethylbenzselenazole (Se), CH=CH linkage, bromo-phenolate group, N-C₂H₅]

Example 9

5 g. of 1.2.3.3-tetramethylindoliniumperchlorate and 6 g. of 3.5-dichloro-4-hydroxybenzaldehyde are condensed by heating at 110° C. for half an hour to form a violet-red dyestuff of the following constitution:

[Structural formula with tetramethylindoline (C(CH₃)₂), CH=CH linkage, dichloro-phenolate group, N-CH₃]

Coloring of acetate silk: intensive red.

Example 10

A mixture of 7 g. of 2-methyl-6-phenylbenzoxazole and 5,2 g. diethylsulfate is heated at 120° C. in an oil bath for one hour. 9 g. of 3.5-dibromo-4-hydroxybenzaldehyde and 3 cc. of pyridine are then added to the mass and the whole is heated at 120° C. for a further hour. Finally the melt is dissolved in 200 cc. of a methanolic solution of sodium acetate of 12,5%. On standing an orange-red dyestuff of the following formula crystallizes out:

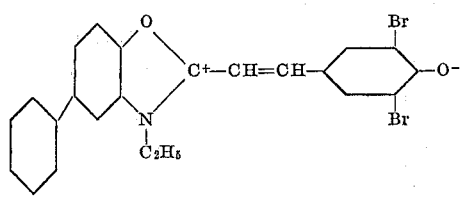

Example 11

On replacing 2-methyl-6-phenylbenzoxazole in Example 10 by 2-methyl-6-chlorobenzoxazole an analogous dyestuff likewise yielding an orange-red solution and coloring and having the following formula is obtained:

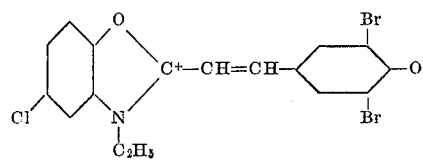

Example 12

5 g. of 2-methyl-1-phenyl-benzimidazole and 5 cc. of dimethylsulfate are heated at 140° C. in an oil bath for one hour. 8 g. of the sodium salt of 3.5-dibromo-4-hydroxybenzaldehyde (obtained by precipitating an aqueous alkaline solution of the dibromohydroxybenzaldehyde with a concentrated solution of sodium hydroxide in excess), 20 cc. of pyridine and 5 cc. of piperidine are then added thereto and the whole is subsequently heated at 110° C. for 6 hours. After acidifying the mass with diluted acetic acid; the precipitated dyestuff is sucked off, dissolved in methanol and slowly mixed with ether. Orange-red crystals dissolving in pyridine with an orange-red color are obtained. The dyestuff has the following formula:

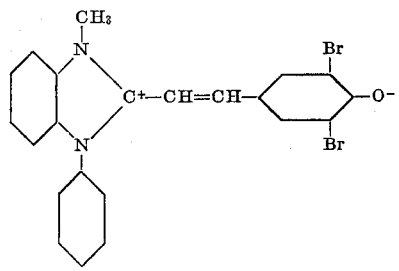

Absorption maximum in pyridine: 525 m$\mu$. Color of the methanolic solution: yellow.
Absorption maximum: 460 m$\mu$. Coloring: pure-yellow.

Example 13

A mixture of 5 g. of 2-methylbenzthiazole-$\beta$-propionyl bromide, 4 g. of 2-methyl-3.5-dibromo-4-hydroxybenzaldehyde and 2 cc. of pyridine is heated at 105° C. for half an hour. The melt is then rubbed together with propanol and the resulting dyestuff sucked off. It is of the following formula:

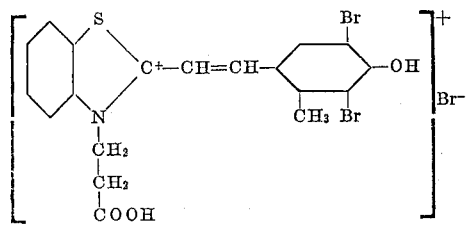

Color of the solution and coloring: carmine red.

Example 14

5 g. of 2-methylbenzthiazole-$\beta$-propeionylbromide and 5 g. of 3-bromo-4-hydroxy-5-ethoxybenzaldehyde are condensed in the manner as described in Example 13 to form a dyestuff of the following constitution:

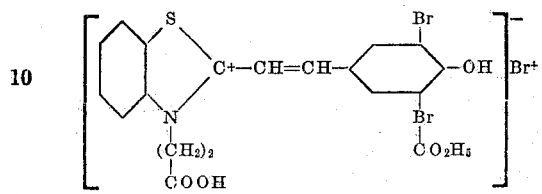

Color of the solution: deep-red.

Example 15

10 g. of 2-methylbenzthiazole ethyliodide and 10 g. of 3.5-dibromosalicylaldehyde are condensed with 20 g. of pyridine by heating for half an hour. The solution is then mixed with 5-times its weight of propanol and caused to crystallize out. The dyestuff thus obtained has the following formula:

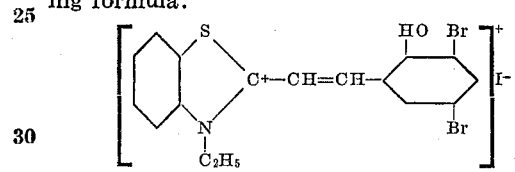

Coloring of wool and acetate silk: blue-violet.

Example 16

When in Example 15 3.5-dibromoresorcylaldehyde is used instead of 3.5-dibromosalicylaldehyde, a dyestuff yielding violet colorings and having the following constitution is produced:

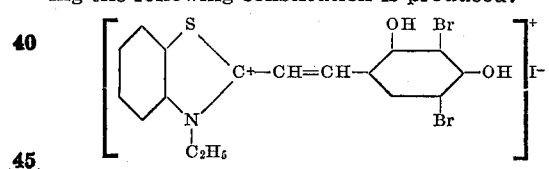

I claim:
1. A dyestuff of the following general formula:

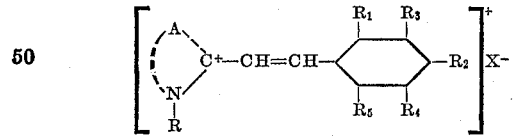

wherein A means a grouping of molecules necessary to complete a ring selected from the class consisting of a 5-membered and a 6-membered ring usual in cyanine dye art; R means a radicle selected from the class consisting of alkyl, aryl, alkylenecarboxylic acid; $R_1$ and $R_2$ mean radicles selected from the class consisting of hydrogen and hydroxyl, at least one of said radicles always being hydroxyl; $R_3$ and $R_4$ mean radicles selected from the class consisting of hydrogen, halogen, and alkyl, oxyalkyl at least one of the said radicles always being halogen; $R_5$ means a radicle selected from the class consisting of hydrogen and alkyl; X means an anionic acid radicle.

2. Compounds of the following formula:

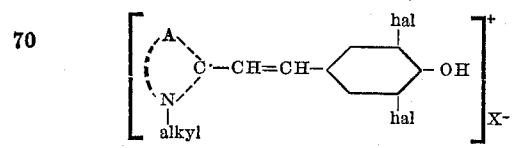

wherein A represents the atoms necessary to complete a nitrogenous heterocyclic nucleus of the type usual in cyanine dyes, hal is halogen, and X is an anion.

3. Compounds of the following formula:

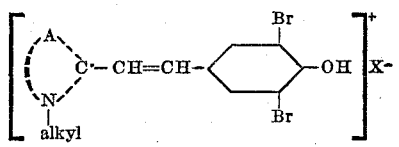

wherein A represents the atoms necessary to complete a nitrogenous heterocyclic nucleus of the type usual in cyanine dyes, and X is an anion.

4. The compounds defined in claim 3 wherein A represents the atoms necessary to complete a benzoxazole nucleus.

5. The compounds defined in claim 3 wherein A represents the atoms necessary to complete a thiazole nucleus.

6. Compounds of the following formula:

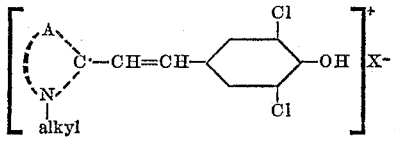

wherein A represents the atoms necessary to complete a nitrogenous heterocyclic nucleus of the type usual in cyanine dyes, and X is an anion.

OSKAR RIESTER.